United States Patent
Tanaka

(10) Patent No.: US 7,239,829 B2
(45) Date of Patent: Jul. 3, 2007

(54) IMAGE FORMING APPARATUS AND PHASE ADJUSTMENT OF IMAGE CARRIERS OF THE IMAGE FORMING APPARATUS

(75) Inventor: Kimihiro Tanaka, Ikeda (JP)

(73) Assignee: Ricoh Co., Ltd., Tokyo (JP)

( * ) Notice: Subject to any disclaimer, the term of this patent is extended or adjusted under 35 U.S.C. 154(b) by 158 days.

(21) Appl. No.: 11/101,575

(22) Filed: Apr. 8, 2005

(65) Prior Publication Data

US 2005/0238388 A1 Oct. 27, 2005

(30) Foreign Application Priority Data

Apr. 8, 2004 (JP) .............................. 2004-113753

(51) Int. Cl.
G03G 15/00 (2006.01)
G03G 15/01 (2006.01)
(52) U.S. Cl. ..................... 399/167; 399/82; 399/301
(58) Field of Classification Search ............... 399/167, 399/298, 299, 302, 82, 72, 301; 347/115, 347/116
See application file for complete search history.

(56) References Cited

U.S. PATENT DOCUMENTS 6,173,141 B1 * 1/2001 Sakagami et al. .......... 399/167

2003/0021613 A1 * 1/2003 Koide ........................ 399/167
2003/0152402 A1 * 8/2003 Ehara et al. ................. 399/167
2003/0180072 A1 * 9/2003 Ohashi et al. ............... 399/167
2004/0161263 A1 * 8/2004 Ehara ......................... 399/167
2004/0223785 A1 * 11/2004 Abe ............................ 399/167
2005/0084293 A1 * 4/2005 Fukuchi et al. ............. 399/167

FOREIGN PATENT DOCUMENTS

EP 1 429 201 A1 * 6/2004
JP 2002-311672 10/2002

* cited by examiner

Primary Examiner—Sophia S. Chen
(74) Attorney, Agent, or Firm—Oblon, Spivak, McClelland, Maier & Neustadt, P.C.

(57) ABSTRACT

An image forming apparatus capable of operating in a full-color mode or in a monochrome mode includes a first driving mechanism, a second driving mechanism, a transfer member, and a controller. The first driving mechanism drives the color image carriers and the second driving mechanism drives a black image carrier in a first direction to form a color and black toner images on a transfer member. The controller synchronizes the first driving mechanism and the second driving mechanism after conducting an image forming operation in the full-color mode or in the monochrome mode to conduct a phase alignment between the color image carriers and the black image carrier.

26 Claims, 8 Drawing Sheets ically to an image forming apparatus configured to adjust phases of image carriers after conducting an image forming operation in the full-color or monochrome operating modes.

IMAGE FORMING APPARATUS AND PHASE ADJUSTMENT OF IMAGE CARRIERS OF THE IMAGE FORMING APPARATUS

CROSS REFERENCE TO RELATED APPLICATION

This application claims priority from Japanese patent application No. 2004-113753 filed on Apr. 8, 2004 in the Japan Patent Office, the entire contents of which are herein incorporated by reference.

BACKGROUND OF THE INVENTION

1. Field of the Invention

The present invention relates to an image forming apparatus configured to select a full-color operating mode for producing a full-color image and a monochrome operating mode for producing a monochrome image (i.e., black and white image), and more particularly to an image forming apparatus configured to adjust phases of image carriers after conducting an image forming operation in the full-color or monochrome operating modes.

2. Description of the Related Art

Image forming apparatuses having a full-color operating mode for transferring color or black toner images from image carriers to a transfer member, and a monochrome operating mode for transferring black toner images from an image carrier to a transfer member have been publicly known and marketed as, for example, electro-photocopying apparatuses, printers, and facsimiles or as multi-functional apparatuses having at least one combination of these devices. The transfer member in these apparatuses may include an intermediate transfer member, and a recording medium, onto which images are recorded and fixed.

In order to prevent color displacement in a full-color image formed on the transfer member (i.e., intermediate transfer member or recording medium) in the above-mentioned image forming apparatus, a predetermined phase relationship is required between the color and black image carriers. One way of setting the phase relationship between the image carriers is to adjust eccentricity positions of each of the image carriers. Hereinafter, in order to simplify the description, the color and black image carriers are collectively referred as "image carriers."

During monochrome image formation operation, the color image carriers are disengaged from the transfer member, and only the black image carrier rotates to form a black toner image on the transfer member. Therefore, after a monochrome image forming operation, the predetermined phase relationship, which is set for the color and black image carriers for full-color operation, may deviate from an original setting.

Accordingly, after completion of a monochrome image forming operation, an operation to align the phases between the color and black image carriers is conventionally conducted by adjusting a stop position of the black image carrier. Such phase alignment operation can also be conducted after completion of a full-color image forming operation.

During image forming operations on a full-color or monochrome operating modes, the image carriers are rotated in one direction for forming toner images and transferring the toner images to the transfer member and, after completion of the image forming operation, the image carriers are stopped. However, image carriers may be configured to rotate in the opposite direction (i.e., opposite to the direction of rotation during image forming) after the image forming operation. When the direction of rotation is changed, deposits (e.g., toners and paper powders) accumulated on an edge of a cleaning blade may be dropped, thus permitting the cleaning blade to be effectively cleaned.

In such conventional arrangement, if the image carriers rotate in the inverse direction after conducting the above-mentioned phase alignment operation, the predetermined phase relationship between the full-color and black image carriers may deviate from an optimal position, resulting in a color displacement of the full-color image produced in the next image forming operation.

SUMMARY OF THE INVENTION

The present invention provides an image forming apparatus configured to select either one of a full-color operating mode or a monochrome operating mode.

In one exemplary embodiment, a novel image forming apparatus configured to select either one of a full-color operating mode or a monochrome operating mode includes a first driving mechanism, a second driving mechanism, a transfer member, and a controller. The first driving mechanism includes at least one color image carrier driven by a first driver in a first direction to form a color toner image on the color image carrier. The second driving mechanism includes a black image carrier driven by a second driver in the first direction to form a black toner image on the black image carrier. The transfer member receives the color and the black toner images in the full-color operating mode or the black toner image in the monochrome operating mode.

The controller synchronizes the first driving mechanism and the second driving mechanism after conducting an image forming operation with either one of the full-color or the monochrome operating modes. The controller controls the first driver and the second driver to stop the color and the black image carriers after transferring the toner image to the transfer member, to rotate them in a second direction, opposite to the first direction, and to conduct a phase alignment between the image carriers in order to maintain a predetermined phase relationship therebetween. The controller may also be provided with a memory, storing rotation data in the first and second directions of a rotation.

In the above-mentioned image forming apparatus, the color image carrier stops rotating and disengages from the transfer member when operating on the monochrome mode. The controller conducts a phase alignment after the transferring of a toner image under either one of the full-color or monochrome modes of operation.

The controller conducts the phase alignment while differentiating a stop position in which the color and black image carriers stop rotating in the second direction from a respective start position from which the carriers start to rotate to form the toner image, while maintaining the predetermined phase relationship between the image carriers.

In the image forming apparatus of the invention, the transfer member includes an intermediate transfer member and a recording medium transported by a recording medium transporter provided in the image forming apparatus.

The above-mentioned first and second drivers include either one of a DC (direct current) brushless motor or a stepping motor. A first gear driven by the first driver drives the color image carrier and second gear driven by the second driver drives the black image carrier.

In the above-mentioned image forming apparatus, the controller controls the first and second drivers by gradually increasing the number of clock signal pulses when the drivers are activated. The controller may also control the first and second drivers by stabilizing the number of clock signal pulses when the drivers operate in a stable condition and by gradually decreasing the number of clock signal pulses when the first and second drivers are deactivated.

A novel method of preventing displacement of an image produced with an image forming apparatus configured to select between full-color and monochrome modes of operation includes providing first and second driving mechanisms, wherein the first driving mechanism drives a plurality of color image carriers coupled to a plurality of gears with a first driver, and the second driving mechanism drives a black image carrier coupled to a gear with a second driver; selecting either one of the full-color or the monochrome operating modes for an image forming operation; disengaging the first driving mechanism from the image forming operation when in the monochrome operating mode; performing the image forming operation with the driving mechanism; stopping the driving mechanism; driving the image carrier in a second direction, opposite to the first direction; increasing a rotational speed of the driver step by step; stabilizing the rotational speed of the driver; sensing a feeler provided to the gear coupled to the image carrier; and decreasing the rotational speed of the driver in a step-wise fashion after a predetermined time has passed from the sensing step to stop the driver.

BRIEF DESCRIPTION OF THE DRAWINGS

A more complete appreciation of the disclosure and many of the attendant advantages and features thereof can readily be obtained and understood from the following detailed description with reference to the accompanying drawings, wherein.

DETAILED DESCRIPTION OF THE PREFERRED EMBODIMENTS

Figure 1:
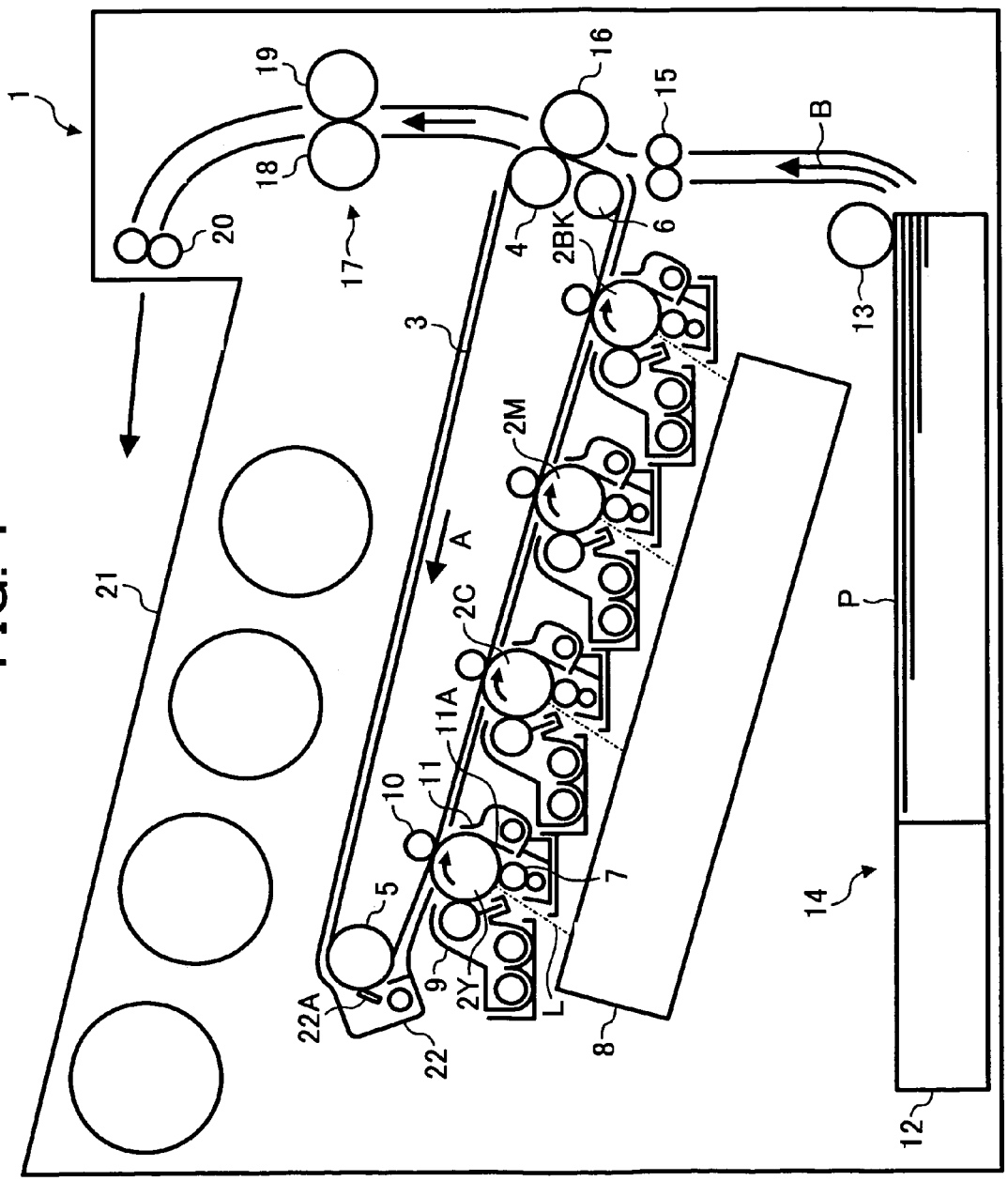
FIG. 1 is a schematic sectional view of an image forming apparatus according to an exemplary embodiment of the present invention.

In describing exemplary embodiments illustrated in the drawings, specific terminology is employed for the sake of clarity. However, the disclosure of this present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1, an image forming apparatus according to an exemplary embodiment of the present invention is described.

As shown in FIG. 1, an image forming apparatus 1 includes image carriers 2Y, 2C, 2M, and 2BK (collectively referred to as "image carrier 2"), an intermediate transfer member 3, an optical writing unit 8, a fusing unit 17, a sheet feed cassette 12, and a sheet feed unit 14.

The image carriers 2Y, 2C, 2M, and 2BK are formed of drum-shaped photoconductive members, having identical diameters. The intermediate transfer member 3 is formed of an endless belt and extended by support rollers 4, 5 and 6. Each of the image carriers 2Y, 2C, 2M, and 2BK rotates in a clockwise direction as shown in FIG. 1, while contacting surfaces of the image carriers 2Y, 2C, 2M, and 2BK to a surface of the intermediate transfer member 3.

Each of the color image carriers 2Y, 2C, 2M is driven by a motor for color process (hereinafter, "first driver") and the black image carrier 2BK is driven by a motor for monochrome process (hereinafter, "second driver"), which motors are to be described later. The intermediate transfer member 3 travels in the direction shown in FIG. 1 by arrow A, wherein the intermediate transfer member 3 is driven by a third driver to be described later.

The processes of transferring toner images formed on each of the image carriers 2Y, 2C, 2M, and 2BK to the intermediate transfer member 3 are substantially similar to one another except to the different toner colors. Accordingly, a representative image transferring process from the image carrier 2 to the intermediate transfer member 3 will be explained next.

As shown in FIG. 1, the color image carrier 2Y is surrounded by a plurality of components to form a toner image on a surface of the color image carrier 2Y. Such components include a charge roller 7, a developing unit 9, a first transfer roller 10, and a first cleaning unit 11 having a cleaning blade 11A.

When the color image carrier 2Y rotates in a clockwise direction, the charge roller 7 charges the color image carrier 2Y to a predetermined voltage. A laser beam L, modulated and emitted from the optical writing unit 8, scans the charged color image carrier 2Y to write an electrostatic latent image on the color image carrier 2Y. The developing unit 9 develops the electrostatic latent image to form a yellow toner image on the surface of the color image carrier 2Y.

The first transfer roller 10 is provided at a position facing the color image carrier 2Y, sandwiching the intermediate transfer member 3 between the first transfer roller 10 and the color image carrier 2Y. The first transfer roller 10, charged with a transfer voltage, transfers the toner image formed on the color image carrier 2Y to the intermediate transfer member 3 traveling in the direction shown by arrow "A". After the toner image transfer, the cleaning blade 11A contacts the surface of the color image carrier 2Y in order to clean the image carrier by scraping toner particles left on the surface image carrier 2Y.

As previously indicated, the above-described image forming processes is similarly conducted on each of the image carriers 2C, 2M, and 2BK to form a cyan toner image, a magenta toner image, and a black toner image, respectively, which are sequentially transferred to the intermediate transfer member 3, superimposing the yellow toner image already transferred thereto. After transferring the toner images, toners remaining on each of the image carriers 2C, 2M, and 2BK are removed by corresponding first cleaning units 11 in each image carrier as in the color image carrier 2Y.

In a lower portion of the image forming apparatus 1, the sheet feed cassette 12 storing a recording medium P, such as transfer sheet and resin sheet, and the sheet feed unit 14, having a feed roller 13, are provided as shown in FIG. 1. When the feed roller 13 rotates, the recording medium P stored on the upper most position of the sheet feed cassette 12 is fed out in the direction shown by arrow B shown in FIG. 1. A registration roller 15 feeds the recording medium P to a space between a second transfer roller 16 and the intermediate transfer member 3 with a predetermined timing. The second transfer roller 16, charged with a predetermined transfer voltage, transfers the superimposed toner images to the recording medium P from the intermediate transfer member 3.

The recording medium P is then fed to the fusing unit 17, having a fixing roller 18 and a pressure roller 19. When the recording medium P passes through a space between the fixing roller 18 and the pressure roller 19, the fixing roller 18 and the pressure roller 19 applies heat and pressure to the recording medium P to fuse and fix the toner image on the recording medium P. After passing through the fusing unit 17, the recording medium P is ejected to an ejection tray 21 by an ejection roller 20.

Toner particles remaining on the intermediate transfer member 3 after the toner image transfer are removed by a second cleaning unit 22 having a second cleaning blade 22A, which contacts the surface of the intermediate transfer member 3 and scrapes the toner particles remaining thereon.

Figure 2:
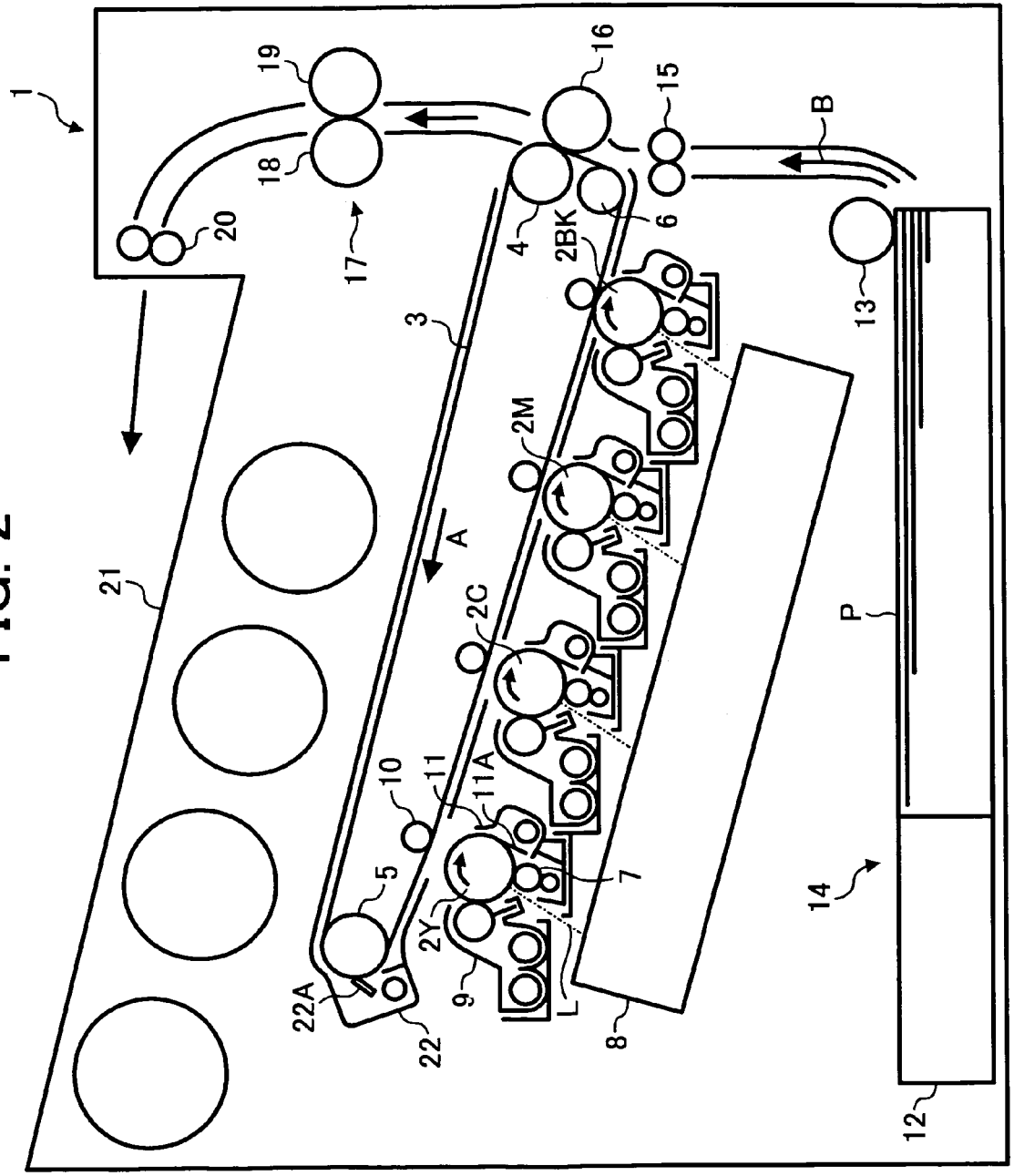
FIG. 2 is a schematic sectional view of the image forming apparatus of FIG. 1, in which color image carriers are disengaged from an intermediate transfer member.

Although the above-described processes are used in the full-color operating mode for forming full-color images it can be applied similarly in the monochrome operating mode for forming a monochrome image (i.e., black and white image) on the recording medium P. In the monochrome operating mode, each of the image carriers 2Y, 2C, and 2M disengages from the intermediate transfer member 3 as shown in FIG. 2, and only the image carrier 2BK engages with the intermediate transfer member 3. Accordingly, the image carriers 2Y, 2C, and 2M do not rotate, and only the image carrier 2BK rotates. A black toner image is formed on the image carrier 2BK and transferred to the recording medium P with similar processes as in the full-color operating mode. The disengagement of the image carriers 2Y, 2C, and 2M from the intermediate transfer member 3 and their lack of rotation in the monochrome operating mode are attractive features because they prolong the lifetime of the image carriers 2Y, 2C, and 2M.

After transferring the toner image from the image carriers 2Y, 2C, 2M, and 2BK to the intermediate transfer member 3 in the full-color operating mode, the image carriers 2Y, 2C, 2M, and 2BK and the intermediate transfer member 3 stop rotating and an inverse operation starts. In this inverse operation, the image carriers 2Y, 2C, 2M, and 2BK, and the intermediate transfer member 3 rotate in a direction opposite to the image transfer direction of rotation at a relatively slower speed. That is, the image carriers 2Y, 2C, 2M, and 2BK rotate in a counter-clockwise direction, and the intermediate transfer member 3 travels in an inverse direction (i.e., opposite to the direction of arrow A). During the inverse operation, a surface linear velocity of each of the image carriers 2Y, 2C, 2M, and 2BK and a surface linear velocity of the intermediate transfer member 3 are set substantially to the same level.

A similar inverse operation takes place in the monochrome operating mode, except that only the black image carrier 2BK and the intermediate transfer member 3 are involved because the other image carriers (2Y, 2C, and 2M) are disengaged from the image forming operation as above-described.

Accordingly, after transferring the toner image from the image carriers 2Y, 2C, 2M, and 2BK to the intermediate transfer member 3, the image carriers 2Y, 2C, 2M, and 2BK and the intermediate transfer member 3 stop rotating, and then the image carriers rotate in the counter-clockwise direction and the intermediate transfer member 3 travels in the inverse direction for both the full-color and the monochrome operating modes in the present invention.

During the inverse operation, while the image carriers 2Y, 2C, 2M, and 2BK rotate in the counter-clockwise direction, deposits (e.g., toners and paper powders) accumulated on the edges of the first cleaning blades 11A can be effectively removed. Similarly, while the intermediate transfer member 3 travels in the inverse direction, deposits (e.g., toners and paper powders) accumulated on the edges of the second cleaning blade 22A can also be effectively removed.

Figure 3:
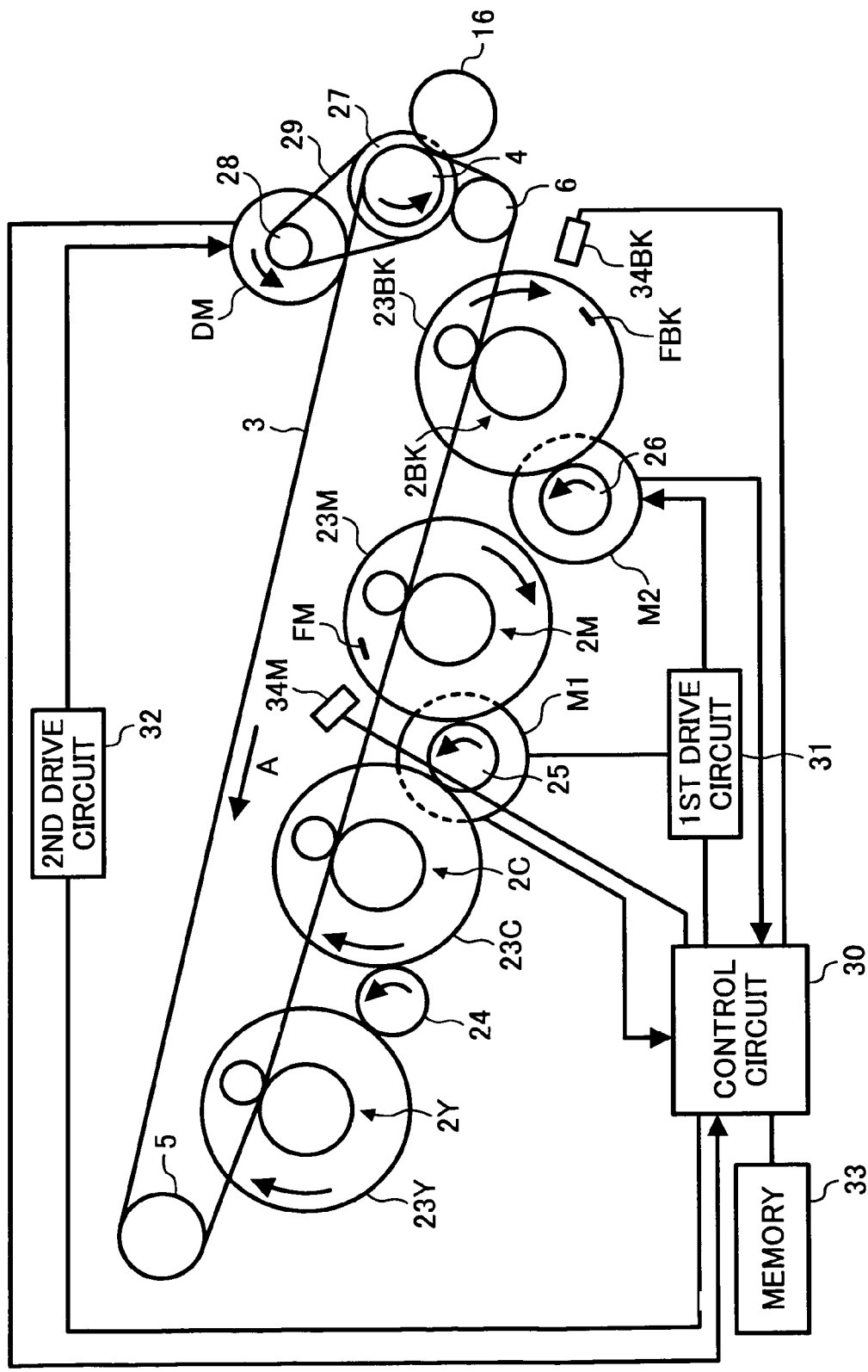
FIG. 3 is a schematic view illustrating a driving system for the image carriers and an intermediate transfer member of FIG. 1.
Figure 4:
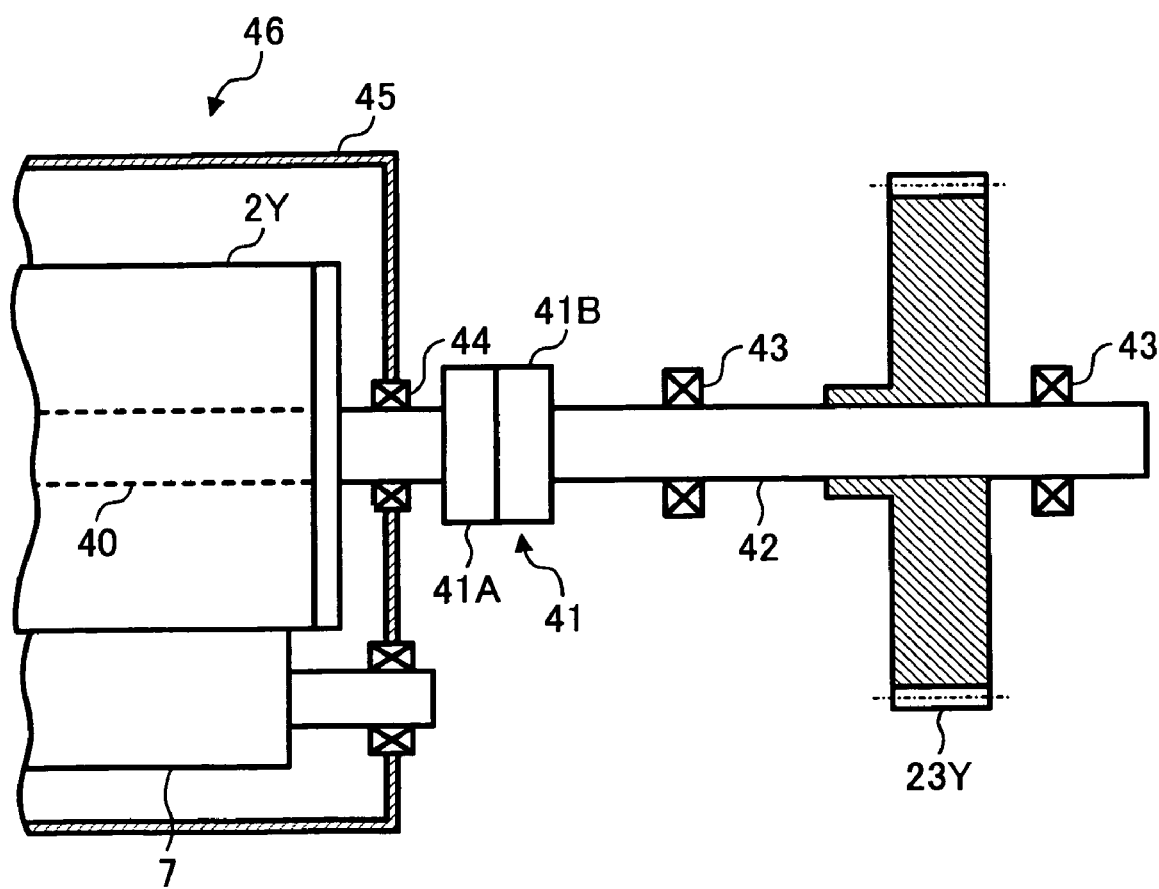
FIG. 4 is a schematic view illustrating an image carrier and a corresponding gear.

As shown in FIG. 3, the image carriers 2Y, 2C, 2M, and 2BK are coupled concentrically to respective gears 23Y, 23C, 23M, and 23BK, each having the same diameter and the same number of teeth as the others. FIG. 4 is a schematic view explaining an arrangement of the image carriers 2Y, 2C, 2M, and 2BK, and the respective gears 23Y, 23C, 23M, and 23BK. FIG. 4 shows only the image carriers 2Y and the gear 23Y because the other image carriers 2C, 2M, and 2BK, and the other respective gears 23C, 23M, and 23BK employ substantially the same illustrated configuration. Although the gear 23Y can be made of any materials such as metal and resin, the gear 23Y is made of a resinous material in the present invention.

As shown in FIG. 4, the image carrier 2 has an image-carrier shaft 40, which is concentrically fixed with the image carrier 2Y, and detachably coupled to a drive shaft 42 via a joint section 41 that includes a first joint member 41A on the image carrier 2Y side and a second joint member 41B on the gear 23Y side. As shown in FIG. 4, the gear 23Y is fixed to the drive shaft 42, which is rotatably supported by a frame (not shown) of the image forming apparatus 1 via a first bearing 43, and aligned concentrically with the image-carrier shaft 40.

As also shown in FIG. 4, an image-carrier casing 45 rotatably supports the image-carrier shaft 40 via a second bearing 44 and the charge roller 7. A process cartridge 46 includes at least the image carrier 2Y, the image-carrier shaft 40, the charge roller 7, and the image-carrier casing 45. The process cartridge 46 is detachably disposed in to the image forming apparatus 1. When removing the process cartridge 46, the first joint member 41A and the second joint member 41B are detached.

As shown in FIG. 3, an intermediate gear 24 is meshed with the gear 23Y coupled to the color image carrier 2Y and the gear 23C coupled to the color image carrier 2C. Accordingly, the gears 23Y and 23C rotate with each other via the intermediate gear 24. As also shown in FIG. 3, a first output gear 25, fixed to an output shaft of the first driver M1, is meshed with the gear 23C coupled to the color image carrier 2C and the gear 23M coupled to the color image carrier 2M. Accordingly, the first output gear 25 drives the gears 23C and 23M. A second output gear 26, fixed to an output shaft of second driver M2, is meshed with the gear 23BK coupled to the image carrier 2BK. Accordingly, the second output gear 26 drives the gear 23BK.

When the first driver M1 is activated, the first output gear 25 rotates in a counter-clockwise direction. Then, the gears 23C and 23M, meshed with the first output gear 25, rotate in a clockwise direction and the color image carriers 2C and 2M rotate in the clockwise direction with the gears 23C and 23M at the same rotational speed. In addition, when the gear 23C rotates in a clockwise direction, the intermediate gear 24 rotates in a counter-clockwise direction. Thus, the gear 23Y meshed to the intermediate gear 24 rotates in a clockwise direction. Accordingly, the color image carrier 2Y rotates in the same direction as the gear 23Y and at the same rotational speed. As such, the color image carrier 2Y, 2C and 2M rotate at the same rotational speed.

When the second driver M2 is activated, the second output gear 26 rotates in the counter-clockwise direction and the gear 23BK meshed to the second output gear 26 rotates in the clockwise direction. Accordingly, the black image carrier 2BK rotates with the gear 23BK in the clockwise direction at the same rotational speed.

As shown in FIG. 3, a timing mechanism includes a first timing pulley 27, a second timing pulley 28, a timing belt 29, and an output shaft of the third driver DM, which may be a motor, for example. The support roller 4 is integrally linked to and concentrically arranged with the first timing pulley 27 while the second timing pulley 28 is fixed to the output shaft of the third driver DM. An endless timing belt 29 is disposed over the first timing pulley 27 and the second timing pulley 28.

When the third driver DM is activated, the second timing pulley 28 rotates in a counter-clockwise direction. The rotation of the timing pulley 28 is transmitted to the first timing pulley 27 via the timing belt 29. Then the support roller 4 rotates with the first timing pulley 27 in a counter-clockwise direction at the same rotational speed. Consequently, the intermediate transfer member 3 travels in the direction of arrow A shown in FIG. 3.

The above-mentioned image forming operation is conducted by using rotations of the image carriers 2Y, 2C, 2M, and 2BK, and the intermediate transfer member 3. As shown in FIG. 3, a control circuit 30 controls rotation of the drivers M1, M2, and DM as a whole, while a first drive circuit 31 controls the drivers M1, M2, and a second drive circuit 32 controls the driver DM. Hereinafter, in order to simplify the discussion, the first driver M1, the second driver M2, and the third driver DM are collectively referred to as "drivers M1, M2, and DM," "drivers M1 and M2," or individually referred to as "driver M1," "driver M2," and "driver DM," as required.

The drivers M1, M2, and DM may be of any type, including, but not being limited to, a stepping motor and a DC (direct current) brushless motor, for example. Preferably, the DC brushless motor is used for the drivers M1, M2, and DM. Compared to the stepping motor, the DC brushless motor can reduce the noise level and power consumption of the motor. In view of such advantages, the drivers M1, M2, and DM in the image forming apparatus 1 preferably employ the DC brushless motors, controlled (i.e., instructed) by clock signals.

The image forming apparatus 1 includes a memory 33 shown in FIG. 3 for storing data of a predetermined velocity curve. The control circuit 30 outputs clock signals, corresponding to velocity curve data stored in the memory 33, to the drivers M1, M2, and DM (e.g., DC brushless motors), thus controlling the rotational speeds of the drivers by the number of clock signal pulses.

Figure 5:
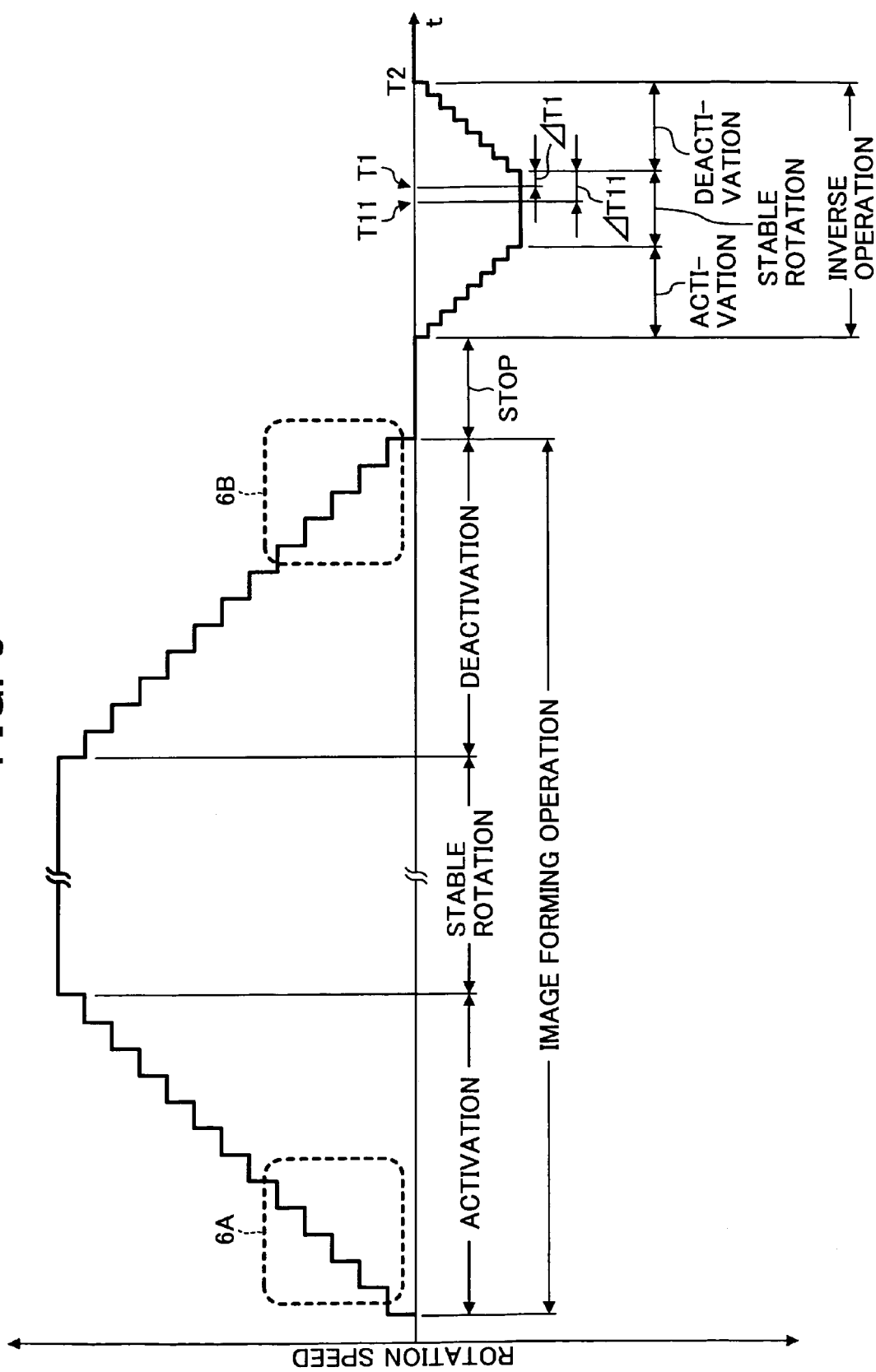
FIG. 5 is a chart illustrating the variation of the rotational speed of a driver used in an image forming operation as a function of time and an inverse operation.
Figure 6A:
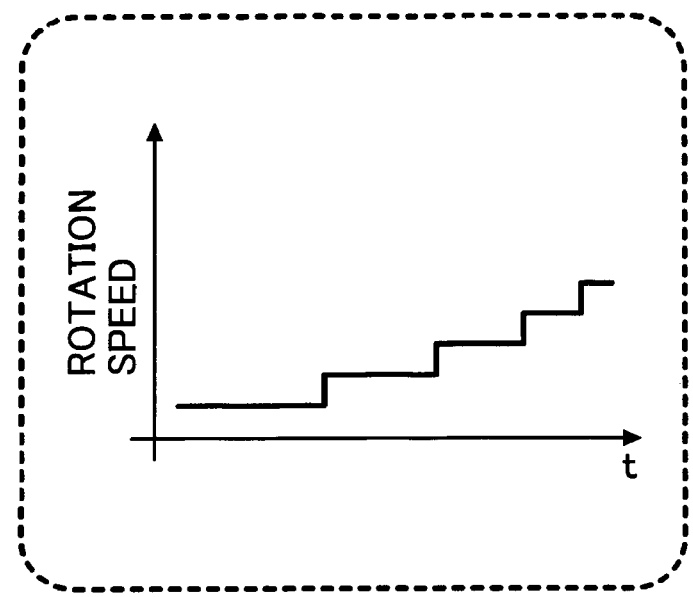
FIGS. 6A and 6B are charts illustrating driver input signals used in an image forming operation and an inverse operation.
Figure 6B:
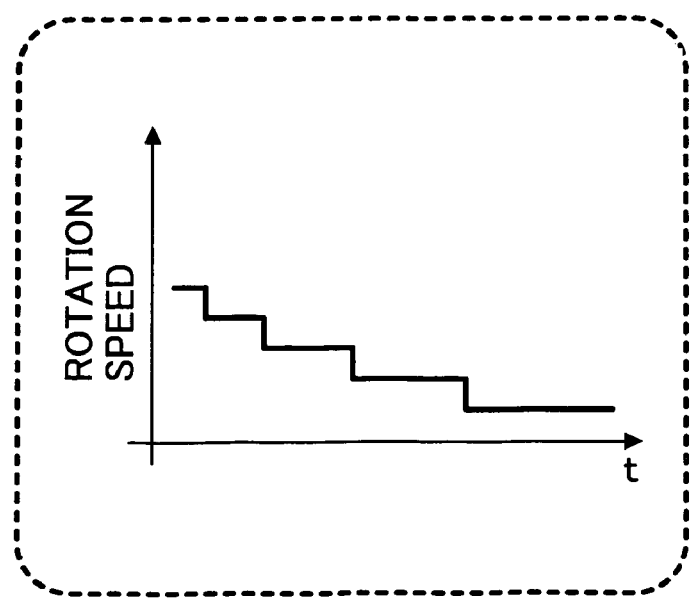

The rotational speed of the driver M1 and the driver M2 are controlled as shown in FIGS. 5, 6A, and 6B. When the image forming operation is activated, the number of clock signal pulses is gradually increased, thus controlling the rotations of the drivers M1 and M2 so that their rotational speeds increase step-wisely.

When the image forming operation reaches a stable condition, a substantially constant number of clock signal pulses controls the rotations of the drivers M1 and M2 so that their rotational speeds are maintained at substantially the same level. During such stable condition, toner images are formed on the image carriers, transferred to the intermediate transfer member 3, and then transferred to the recording medium P.

When the image forming operation is deactivated, the number of clock signal pulses is gradually decreased, thus controlling the rotations of the drivers M1 and M2 so that their rotational speeds decrease step-wisely until they come to a stop.

Once the drivers M1, M2, and DM are stopped, their inverse operation starts, in which the drivers M1, M2, and DM rotate in a direction opposite to the direction used for the image forming operation. When the inverse operation is activated, a gradually increasing number of clock signal pulses controls the rotations of the drivers M1 and M2 so that their rotational speeds increase step-wisely. Once the inverse operation reaches a stable condition, a substantially constant number of clock signal pulses controls the rotations of the drivers M1 and M2 so that their rotational speeds are maintained at substantially the same level.

When the inverse operation is deactivated, the number of clock signal pulses is gradually decreased, thus controlling the rotations of the drivers M1 and M2 so that their rotational speeds decrease step-wisely.

By controlling the drivers M1, M2, and DM (e.g., the DC brushless motors) as just described, surface linear velocities of the color image carriers, the black image carrier, and the intermediate transfer member can be maintained at substantially the same level during the activation, stable condition, and deactivation periods. Accordingly, damages to the surfaces of the image carriers 2Y, 2C, 2M, 2BK, and the intermediate transfer member 3 caused by friction between the image carriers and the intermediate transfer member can be effectively minimized.

FIG. 6A illustrates the variation of driver rotational speed as a function of time for which the time period for each rotational speed level, increasingly step-wisely, decreases during the activation period of the drivers M1, M2, and DM. FIG. 6B illustrates the variation of driver rotational speed as a function of time for which the time period for each rotational speed level, decreasingly step-wisely, increases during the deactivation period of the drivers M1, M2, and DM. When the drivers M1, M2, and DM are controlled to rotate as shown in FIGS. 6A and 6B, their rotational speed can be increased or decreased stably.

Figure 7:
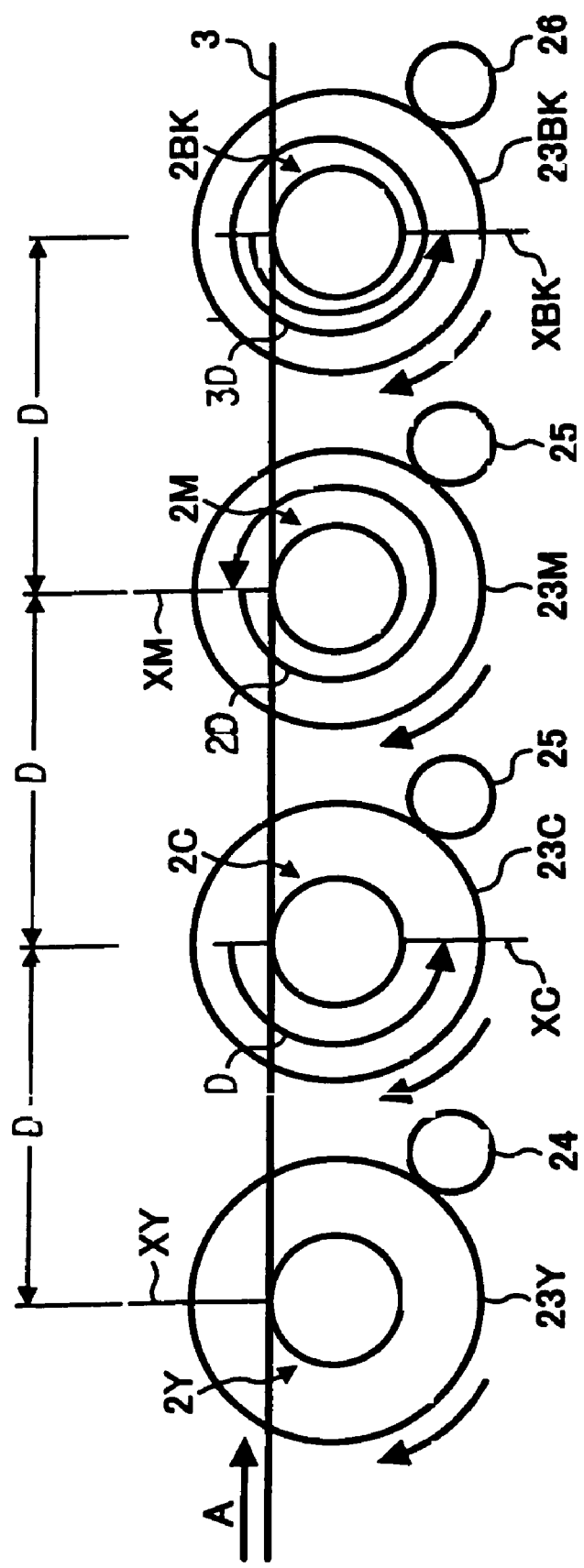
FIG. 7 is a schematic view illustrating a phase relationship between image carriers and gears.

The gears 23Y, 23C, 23M, and 23BK, when made of resinous material, inherently have some eccentricity. Such eccentricity may lead to color displacement of the toner images superimposedly transferred from the image carriers 2Y, 2C, 2M, and 2BK to the intermediate transfer member 3. To prevent such color displacement, the gears 23Y, 23C, 23M, and 23BK, and the respective image carriers 2Y, 2C, 2M, and 2BK are coupled to each other with a predetermined phase relationship with respect to the circumferential positions of the gears and image carriers. FIG. 7 is a schematic view illustrating a phase relationship adjustment between the image carriers 2Y, 2C, 2M, and 2BK and the respectively coupled gears 23Y, 23C, 23M, and 23BK.

As shown in FIG. 7, the transfer position of the adjacent image carriers 2Y, 2C, 2M, and 2BK is spaced apart from each other by the same distance D. In FIG. 7, reference characters XY, XC, XM, and XBK indicate reference positions on a circumferential direction of the image carriers 2Y, 2C, 2M, and 2BK coupled to the gears 23Y, 23C, 23M, and 23BK, respectively.

Specifically, the circumferential position having a maximum radius of the gear 23Y and a circumferential position having a maximum radius of the image carrier 2Y are aligned on the same position XY. Similarly, the reference positions XY, XC, and XM are set for the gears 23C, 23M, 23BK and the image carriers 2C, 2M, 2BK.

In FIG. 7, the reference position XY corresponds to a transfer position in which the yellow toner image on the image carrier 2Y is transferred to the intermediate transfer member 3. At this time, the reference position XC of the image carrier 2Y, next to the image carrier 2C, is at a circumferential position substantially separated from the transfer position of the image carrier 2Y by a distance L as shown in FIG. 7. Similarly, the reference position XM of the image carrier 2M is substantially separated from the transfer position of the image carrier 2Y by a distance of 2L, and the reference position XBK of the image carrier 2BK is substantially separated from the transfer position of the image carrier 2Y by a distance of 3L.

The intermediate gear 24 meshes with the gears 23Y and 23C, the first output gear 25 meshes with the gears 23C and 23M, and the second output gear 26 meshes with the gears 23BK at the positions shown in FIG. 3. In order to simplify the explanation, the intermediate gear 24 is illustrated as meshing with the gear 23Y, the first output gear 25 meshing with the gears 23C and 23M, and the second output gear 26 meshing with the gear 23BK at substantially the same circumferential positions of the gears as shown in FIG. 7.

When the phases of the circumferential positions of the gears 23Y, 23C, 23M, 23BK and the image carriers 2Y, 2C, 2M, 2BK are set as just described, and the mesh position between the intermediate gear 24, the first output gear 25, the second output gear 26 and the gears 23Y, 23C, 23M are set as just explained, the color displacement on the superimposed toner images transferred to the intermediate transfer member 3 can be prevented even if a slight eccentricities exist in the gears 23Y, 23C, 23M, and 23BK.

In FIG. 3, the phases of the image carriers 2Y, 2C, 2M, 2BK, and the gears 23Y, 23C, 23M, 23BK, and the mesh positions between the intermediate gear 24, the first output gear 25, the second output gear 26, and the gears 23Y, 23C, 23M, 23BK are arranged in a manner so that the effect illustrated in FIG. 7 can be obtained. In other words, installation positions of the gears 23Y, 23C, 23M, and 23BK are set such that a color displacement does not occur in a full-color image.

In the full-color operating mode, the first driver M1 drives the color image carriers 2Y, 2C, and 2M, and the second driver M2 drives the black image carrier 2BK. Then, the color toner images formed on the color image carriers 2Y, 2C, and 2M, and the black toner image formed on the black image carrier 2BK are transferred to the intermediate transfer member 3 to obtain a full-color image.

In the monochrome operating mode, the second driver M2 drives the black image carrier 2BK while the color image carriers 2Y, 2C, and 2M are stopped and disengaged from the intermediate transfer member 3. The black toner image formed on the black image carrier 2BK is transferred to the intermediate transfer member 3 to obtain a monochrome image (i.e., black and white image).

The full-color operating mode and the monochrome operating mode can be easily switched in the image forming apparatus 1. When the monochrome operating mode is active, the gears 23Y, 23C, 23M and the color image carriers 2Y, 2C, 2M stop rotating, and only the gear 23BK and the black image carrier 2BK rotate. Accordingly, after conducting the image forming operation in the monochrome operating mode, the predetermined phase relationship between the circumferential positions of the gears 23Y, 23C, 23M, and 23BK illustrated in FIG. 7 cannot be maintained.

As for the image forming apparatus 1, a phase alignment operation is conducted when the image carriers rotate in a counter-clockwise direction (i.e., inverse direction) so that the color image carriers 2Y, 2C, and 2M and the black image carrier 2BK can maintain a predetermined phase relationship. Such phase alignment operation may be conducted only after an image forming operation in the monochrome operating mode, but may also be conducted after an image forming operation in the full-color operating mode. The image forming apparatus 1 is configured to conduct the phase alignment operation after both the full-color and monochrome operating modes. With such phase alignment operation, the image carriers 2Y, 2C, 2M, and 2BK can be maintained at a predetermined phase relationship with a higher precision. A non-limiting example of a method to perform the phase alignment operations as just explained will now be given.

As shown in FIG. 3, a first feeler FM is provided to the gear 23M coupled to the image carrier 2M for forming magenta toner image, and a second feeler FBK is provided to the gear 23BK coupled to the black image carrier 2BK for forming black toner image. A first sensor 34M and a second sensor 34BK are provided to the image forming apparatus 1 to detect the first feeler FM and the second feeler FBK, respectively. Theses sensors 34M and 34BK may be a photo-sensor, for example.

After completing an image forming operation in the full-color operating mode, the drivers M1, M2, and DM conduct an inverse operation as shown in FIG. 5. In FIG. 5, the vertical axis represents the rotational speed of the motor, and the horizontal axis represents time. As shown in FIG. 5, during the stable rotation period of the drivers M1 and M2 in the inverse operation, the first sensor 34M detects the first feeler FM at a time T11, for example. After a first predetermined time $\Delta T1$ has passed from the time T1, the number of clock signal pulses transmitted to the first driver M1 starts to decrease, and the first driver M1 stops at a time T2, for example.

Similarly, during the stable rotation period of the drivers M1 and M2 in the inverse operation, the second sensor 34BK detects the second feeler FBK at a time T11, for example. After a second predetermined time $\Delta T11$ has passed from the time T11, the number of clock signal pulses transmitted to the second driver M2 starts to decrease, and the second driver M2 stops at the time T2, for example.

The above-mentioned predetermined times $\Delta T1$ and $\Delta T11$ are set in advance with values such that the image carriers 2Y, 2C, 2M and 2BK come to positions that assure the predetermined phase relationship illustrated in FIG. 7 when the drivers M1 and M2 stop. The first predetermined time $\Delta T1$ and the second predetermined time $\Delta T11$ can be set to different values or a same value. The first predetermined time $\Delta T1$ and the second predetermined time $\Delta T11$ can also be set to a value of zero.

When the image forming operation is conducted in the monochrome operating mode, the color image carriers 2Y, 2C, and 2M stop rotating. Therefore, only the black image carrier 2BK performs an inverse operation.

Similarly to the inverse operation after the image forming operation in the full-color operating mode, during the stable rotation period of the drivers M2 in the inverse operation after the image forming operation, the second sensor 34BK detects the second feeler FBK at a time T3 (not shown), for example.

After a third predetermined time ΔT33 (not shown) has passed from the time T3, the number of clock signal pulses transmitted to the second driver M2 starts to decrease, and the second driver M2 stops at a time T4 (not shown), for example. This third predetermined time ΔT33 is set in advance with values such that image carriers 2Y, 2C, 2M and 2BK come to positions that assure the predetermined phase relationship illustrated in FIG. 7 when the driver M2 stop, wherein the image carriers 2Y, 2C, 2M stop rotating in the monochrome operating mode.

As for the full-color mode, if the first predetermined time ΔT1 and the second predetermined time ΔT11 are adequately changed each time after the image forming operation in the full-color operating mode, the color image carriers 2Y, 2C, and 2M and black image carrier 2BK, after completing the inverse operation, stop at positions different from start positions of the color image carriers 2Y, 2C, 2M and 2BK, wherein the start position mean a position before starting the image forming operation in the full-color operating mode.

When an phase alignment operation is conducted in the above-described manner after finishing the image forming operation in the full-color operating mode, a predetermined phase relationship between the image carriers 2Y, 2C, 2M and 2BK is maintained while the image carriers 2Y, 2C, 2M, and 2BK stop at positions different from the start positions of the image carriers 2Y, 2C, 2M and 2BK.

If the image carriers 2Y, 2C, 2M and 2BK always stop at the same positions, the same circumferential locations on the surfaces of the image carriers 2Y, 2C, 2M and 2BK will contact the intermediate transfer member 3. In such a case, the same circumferential positions on the surfaces are repeatedly exposed to frictional forces from the intermediate transfer member 3, thus increasing wear and damage to the image carriers 2Y, 2C, 2M and 2BK. However, by differentiating the stop position after the inverse operation as described above, the wear and damage to the surfaces of the image carriers 2Y, 2C, 2M and 2BK can be minimized or prevented.

The image forming apparatus 1 can be configured such that a phase alignment operation is conducted only after an image forming operation in the monochrome operating mode.

If the image forming apparatus 1 is not configured such that a phase alignment operation is conducted after an image forming operation in the full-color operating mode, the first driver M1 and the second driver M2 need to be synchronized at a higher precision level by adjusting their starting and stopping positions in order to maintain a predetermined phase relationship, resulting in a complex adjustment.

As already explained, the image forming apparatus 1 may be configured to conduct a phase alignment operation for both the full-color monochrome operating modes.

A computer program, including computer-readable instructions that, when executed by a computer of an image forming apparatus, instruct the image forming apparatus 1 to carry out the above-described phase alignment is within the scope of this invention. Such computer-readable instructions can be stored in a computer-readable medium provided in the image forming apparatus 1.

By conducting the above-mentioned phase alignment operation, color displacement in a full-color image can be prevented. Furthermore, the above-mentioned phase alignment operation can be conducted at a higher precision level because the phase alignment operation is conducted during an inverse operation of the drivers M1, M2, and DM.

A conventional image forming apparatus has a configuration that phases of the image carriers are adjusted using a reference timing, wherein the reference timing is a time when a first sensor for color image carrier and a second sensor for a black image carrier detect a first feeler for color image carrier and a second feeler for a black image carrier during an image forming operation. After such adjustment, the image carriers are rotated in an inverse direction and stopped. The image carriers are rotated in the inverse direction to remove deposits (e.g., toners and paper powders) accumulated on the edges of a cleaning blade, thus providing for the surfaces of the image carriers to be effectively cleaned.

Accordingly, a predetermined phase relationship between the image carriers may not be adequately maintained, and such condition may affect the next image forming operation, thereby the image carries are further rotated before the next image forming operation to maintain the predetermined phase relationship.

The image forming apparatus 1 according to an exemplary embodiment of the present invention can prevent such drawback as described above.

In addition to the intermediate transfer member 3, an image forming apparatus can employ a recording medium as transfer member which directly receives toner images from image carriers 2Y, 2C, 2M, and 2BK, wherein the recording medium is transported by a recording medium transporter, and such image forming apparatus can apply the above-mentioned configuration for phase alignment operation.

Figure 8:
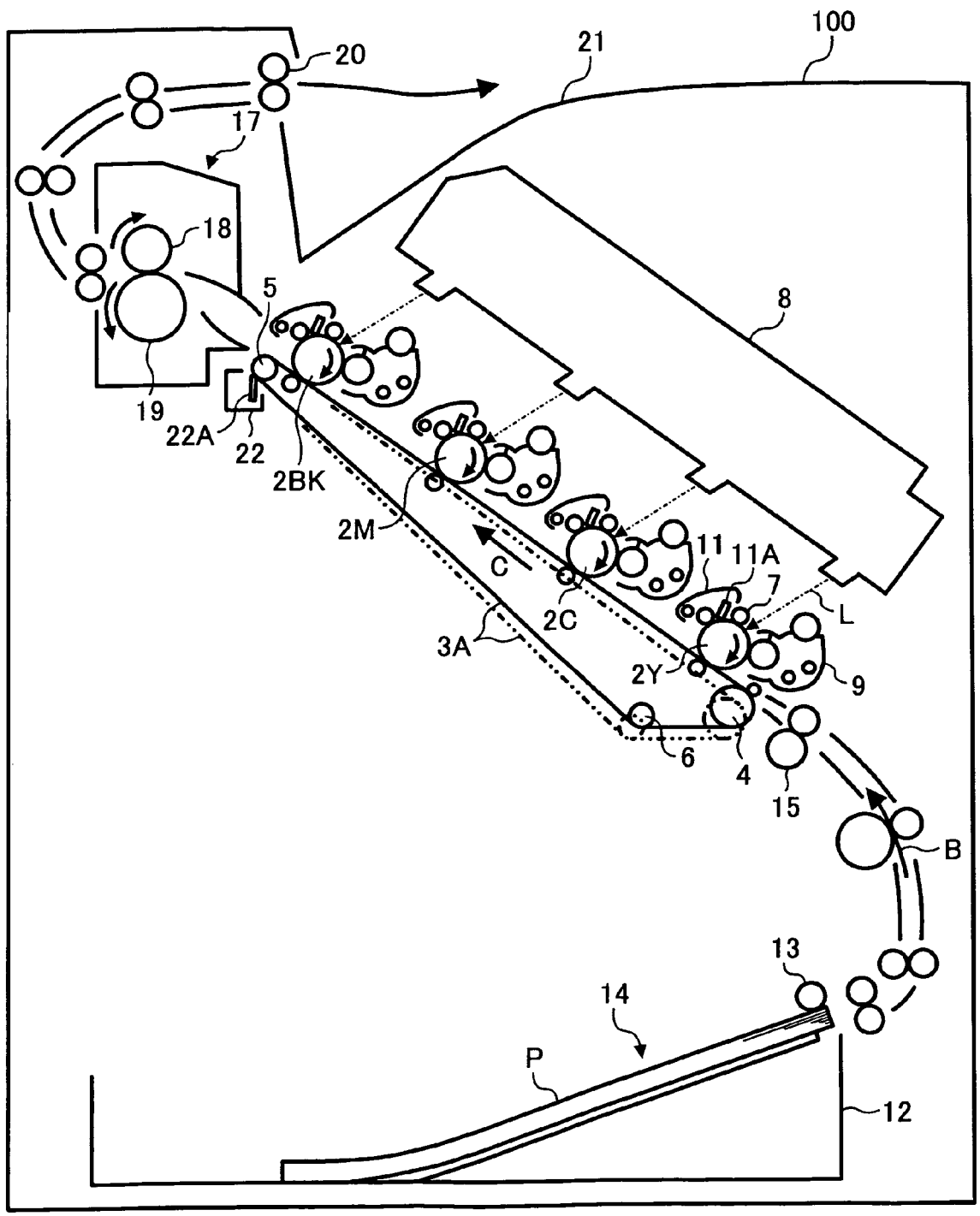
FIG. 8 is a schematic sectional view of an image forming apparatus according to another exemplary embodiment of the present invention.

FIG. 8 is a schematic sectional view of an image forming apparatus according to another exemplary embodiment of the present invention. As shown in FIG. 8, an image forming apparatus 100 includes a substantially similar configuration as in the image forming apparatus 1 in FIG. 1 except that an endless belt recording medium transporter 3A is provided supported by support rollers 4, 5 and 6. The image carriers 2Y, 2C, 2M, and 2BK, having the same diameter, rotate in a clockwise direction. The recording medium transporter 3A travels in the direction of arrow C while contacting the image carriers 2Y, 2C, 2M, and 2BK.

Similar to the image forming apparatus 1 in FIG. 1, a yellow toner image, cyan toner image, magenta toner image and black toner image are respectively formed on the image carriers 2Y, 2C, 2M, and 2BK of the image forming apparatus 100.

The recording medium P, fed from the sheet feed unit 14 and transported by the recording medium transporter 3A, sequentially passes through transfer positions at the image carriers 2Y, 2C, 2M, and 2BK to receive superimposed toner images from the image carriers 2Y, 2C, 2M, and 2BK. The superimposed toner images are then fixed on the recording medium P when the recording medium P passes through the fusing unit 17. The recording medium P, after passing through the fusing unit 17, is ejected to the ejection tray 21.

Deposits (e.g., toners and paper powders) adhered on the surface of the recording medium transporter 3A are scraped and removed by the second cleaning blade 22A of the second cleaning unit 22.

The image forming apparatus 1 in FIG. 1 employs an intermediate transferring method, in which a toner image on the image carrier is transferred to the intermediate transfer member 3 at once, and then transferred to the recording medium P. On the other hand, the image forming apparatus 100 in FIG. 8 employs a direct transferring method, in which a toner image on the image carrier is directly transferred to the recording medium P.

Although not shown in FIG. 8, a driver (e.g., motor) for driving the recording medium transporter 3A, a first driver for driving the color image carriers 2Y, 2C, 2M, and a second driver for driving the black image carrier 2BK may employ a DC brushless motor similar to the image forming apparatus 1 in FIG. 1. Thus, the drivers (e.g., motors) included in the image forming apparatus 100 can be also controlled with the above-described method illustrated in FIGS. 5, 6A, and 6B.

Numerous additional modifications and variations are possible in light of the above teachings. It is therefore to be understood that within the scope of the appended claims, the disclosure of the present invention may be practiced otherwise than as specifically described herein.

The invention claimed is:

1. An image forming apparatus configured to operate in a full-color operating mode or in a monochrome operating mode, the apparatus comprising:
   a first driving mechanism comprising at least one color image carrier and a first driver configured to drive the at least one color image carrier in a first direction to form a color toner image on the at least one color image carrier;
   a second driving mechanism comprising a black image carrier and a second driver configured to drive the black image carrier in the first direction to form a black toner image on the black image carrier;
   a transfer member configured to receive the color toner image and the black toner image in the full-color operating mode or the black toner image in the monochrome operating mode; and
   a controller configured to synchronize the first driving mechanism and the second driving mechanism, after an image forming operation in either one of the full-color operating mode or the monochrome operating mode, by rotating the at least one color image carrier and the black image carrier in a second direction opposite to the first direction.

2. The image forming apparatus according to claim 1, wherein the first driver and the second driver comprises at least one of a DC (direct current) brushless motor or a stepping motor.

3. The image forming apparatus according to claim 1, further comprising a first gear coupled to and configured to drive the at least one color image carrier.

4. The image forming apparatus according to claim 3, wherein the first gear is driven by the first driver.

5. The image forming apparatus according to claim 1, further comprising a second gear coupled to and configured to drive the black image carrier.

6. The image forming apparatus according to claim 5, wherein the second gear is driven by the second driver.

7. An image forming apparatus configured to operate in a full-color operating mode and in a monochrome operating mode, comprising:
   at least one color image carrier configured to rotate in a first direction to carry a color toner image thereon;
   a black image carrier configured to rotate in the first direction to carry a black toner image thereon;
   a transfer member configured to receive the color toner image and the black toner image in the full-color operating mode, or the black toner image in the monochrome operating mode;
   a first driver configured to drive the at least one color image carrier;
   a second driver configured to drive the black image carrier; and a controller configured to control the first driver and the second driver to stop the at least one color image carrier and the black image carrier after transferring the color and black toner images to the transfer member, to rotate the at least one color image carrier and the black image carrier in a second direction opposite to the first direction, and to conduct a phase alignment between the at least one color image carrier and the black image carrier for maintaining a predetermined phase relationship between the at least one color image carrier and the black image carrier.

8. The image forming apparatus according to claim 7, wherein the controller is provided with a memory configured to store rotation data in the first direction and rotation data in the second direction.

9. The image forming apparatus according to claim 7, wherein the at least one color image carrier stops rotating and disengages from the transfer member in the monochrome operating mode.

10. The image forming apparatus according to claim 7, wherein the controller conducts the phase alignment after transferring the toner image in the full-color operating mode or in the monochrome operating mode.

11. The image forming apparatus according to claim 7, wherein the controller conducts the phase alignment while differentiating a respective stop position in which the at least one color image carrier and black image carrier stop rotating in the second direction from a respective start position in which the color image carrier and the black image carrier start to rotate to form the color and black toner images, while maintaining the predetermined phase relationship between the at least one color image carrier and the black image carrier.

12. The image forming apparatus according to claim 7, wherein the transfer member includes an intermediate transfer member.

13. The image forming apparatus according to claim 7, wherein the transfer member further comprises a recording medium.

14. The image forming apparatus according to claim 13, further comprising a recording medium transporter configured to transport the recording medium.

15. The image forming apparatus according to claim 7, wherein the controller controls the first driver and the second driver by gradually increasing a number of clock signal pulses when the first driver and the second driver are activated.

16. The image forming apparatus according to claim 7, wherein the controller further controls the first driver and the second driver by stabilizing a number of clock signal pulses when the first driver and the second driver operates steadily.

17. The image forming apparatus according to claim 7, wherein the controller further controls the first driver and the second driver by gradually decreasing a number of clock signal pulses when the first driver and the second driver are deactivated.

18. An image forming apparatus configured to operate in a full-color operating mode and in a monochrome operating mode, comprising:

a first image carrier configured to carry a color toner image while rotating in a first direction;

a second image carrier configured to carry a black toner image while rotating in the first direction;

image receiving means for receiving the color toner image and the black toner image in the full-color operating mode, or the black toner image in the monochrome operating mode;

a first driver configured to drive the first image carrier;

a second driver configured to drive the second image carrier; and controlling means for conducting a phase alignment of and maintaining a predetermined phase relationship between the first driver and the second driver, after an image forming operation in either one of the full-color operating mode or the monochrome operating mode, by rotating the first image carrier and the second image carrier in a second direction opposite to the first direction.

19. A method of preventing an image displacement in an image produced with an image forming apparatus configured to operate in a full-color operating mode and in a monochrome operating mode, the method comprising:

providing a first driving mechanism and a second driving mechanism, the first driving mechanism being configured to drive a plurality of color image carriers coupled to a plurality of gears with a first driver, and the second driving mechanism being configured to drive a black image carrier coupled to a gear with a second driver;

selecting the monochrome operating mode for an image forming operation;

disengaging the first driving mechanism from the image forming operation;

performing the image forming operation with the second driving mechanism while rotating the black image carrier in a first direction;

stopping the second driving mechanism;

driving the second driver to rotate the black image carrier in a second direction, opposite to the first direction;

increasing in steps a rotational speed of the second driver;

stabilizing the rotational speed of the second driver;

sensing a feeler provided to the gear coupled to the black image carrier; and after sensing, decreasing in steps the rotational speed of the second driver after a predetermined elapsed time since the sensing to stop the second driver.

20. The method according to claim 19, further comprising a controller configured to control the selecting step, the disengaging step, the performing step, the stopping step, the driving step, the increasing step, the stabilizing step, the sensing step, and the decreasing step.

21. The method according to claim 20, wherein the controller is provided with a memory configured to store data at least for the increasing step, the stabilizing step, and the decreasing step.

22. The method according to claim 19, further comprising a sensor configured to detect the feeler at the sensing step.

23. A method of preventing an image displacement in an image produced with an image forming apparatus configured to operate in a full-color operating mode and in a monochrome operating mode, the method comprising:

providing a first driving mechanism and a second driving mechanism, the first driving mechanism being configured to drive a plurality of color image carriers coupled to a plurality of gears with a first driver, and the second driving mechanism being configured to drive a black image carrier coupled to a gear with a second driver;

selecting the full-color operating mode for an image forming operation;

performing the image forming operation with the first driving mechanism and the second driving mechanism while rotating the plurality of color image carriers and the black image carrier in a first direction;

stopping the first driving mechanism and the second driving mechanism;

driving the first driving mechanism and the second driving mechanism to rotate the plurality of color image carriers and the black image carrier in a second direction, opposite to the first direction;

increasing in steps a rotational speed of the first driver and the second driver;

stabilizing the rotational speed of the first driver and the second driver;

sensing a feeler provided to at least one of the plurality of gears coupled to the plurality of color image carriers, and another feeler provided to the gear coupled to the black image carrier; and after sensing, decreasing in steps the rotational speed of the first driver and the second driver after a predetermined elapsed time to stop the first driver and the second driver.

24. A program comprising computer-readable instructions that, when executed by a computer of an image forming apparatus, instructs the image forming apparatus to carry out a method of preventing an image displacement in an image produced with an image forming apparatus configured to operate in a full-color operating mode and a monochrome operating mode, the computer-readable instructions comprising the steps of:

providing a first driving mechanism and a second driving mechanism, the first driving mechanism being configured to drive a plurality of color image carriers coupled to a plurality of gears with a first driver, and the second driving mechanism being configured to drive a black image carrier coupled to a gear with a second driver;

selecting the monochrome operating mode for an image forming operation;

disengaging the first driving mechanism from the image forming operation;

performing the image forming operation with the second driving mechanism while rotating the black image carrier in a first direction;

stopping the second driving mechanism;

driving the second driver to rotate the black image carrier in a second direction, opposite to the first direction;

increasing in steps a rotational speed of the second driver;

stabilizing the rotational speed of the second driver;

sensing a feeler provided to the gear coupled to the black image carrier; and after sensing, decreasing in steps the rotational speed of the second driver after a predetermined elapsed time since the sensing to stop the second driver.

25. The program according to the claim 24, wherein the computer-readable instructions are stored in a computer-readable medium provided in the image forming apparatus.

26. A program comprising computer-readable instructions that, when executed by a computer of an image forming apparatus, instructs the image forming apparatus to carry out a method of preventing an image displacement in an image produced with an image forming apparatus configured to operate in a full-color operating mode and in a monochrome operating mode, the computer-readable instructions comprising the steps of:

providing a first driving mechanism and a second driving mechanism, the first driving mechanism being configured to drive a plurality of color image carriers coupled to a plurality of gears with a first driver, and the second driving mechanism being configured to drive a black image carrier coupled to a gear with a second driver;

selecting the full-color operating mode for an image forming operation;

performing the image forming operation with the first driving mechanism and the second driving mechanism while rotating the plurality of color image carriers and the black image carrier in a first direction;

stopping the first driving mechanism and the second driving mechanism;

driving the first driving mechanism and the second driving mechanism to rotate the plurality of color image carriers and the black image carrier in a second direction, opposite to the first direction;

increasing in steps a rotational speed of the first driver and the second driver;

stabilizing the rotational speed of the first driver and the second driver;

sensing a feeler provided to at least one of the plurality of gears coupled to the plurality of color image carriers, and another feeler provided to the gear coupled to the black image carrier; and after sensing, decreasing in steps the rotational speed of the first driver and the second driver after a predetermined elapsed time to stop the first driver and the second driver.

* * * * *